US010492600B2

(12) United States Patent
Vangura

(10) Patent No.: US 10,492,600 B2
(45) Date of Patent: Dec. 3, 2019

(54) METHOD FOR FORMING A LAMINATE COUNTERTOP

(71) Applicant: Vangura Kitchen Tops, Inc., North Huntingdon, PA (US)

(72) Inventor: Edward P. Vangura, North Huntingdon, PA (US)

(73) Assignee: Vangura Kitchen Tops, Inc., North Huntingdon, PA (US)

( * ) Notice: Subject to any disclaimer, the term of this patent is extended or adjusted under 35 U.S.C. 154(b) by 5 days.

(21) Appl. No.: 15/700,697

(22) Filed: Sep. 11, 2017

(65) Prior Publication Data

US 2019/0075923 A1   Mar. 14, 2019

(51) Int. Cl.
| | |
|---|---|
| *A47B 13/08* | (2006.01) |
| *B32B 7/12* | (2006.01) |
| *B32B 37/12* | (2006.01) |
| *B32B 37/06* | (2006.01) |
| *B32B 21/04* | (2006.01) |
| *A47B 77/02* | (2006.01) |
| *B32B 38/00* | (2006.01) |
| *A47B 96/20* | (2006.01) |

(Continued)

(52) U.S. Cl.
CPC .......... *A47B 13/086* (2013.01); *A47B 77/022* (2013.01); *A47B 96/201* (2013.01); *A47B 96/205* (2013.01); *B32B 7/12* (2013.01); *B32B 21/042* (2013.01); *B32B 37/06* (2013.01); *B32B 37/12* (2013.01); *B32B 38/0004* (2013.01); *A47B 2077/027* (2013.01); *A47B 2200/001* (2013.01); *B29D 99/0039* (2013.01); *B29L 2031/441* (2013.01); *B32B 2309/105* (2013.01); *Y10T 156/1028* (2015.01); *Y10T 156/1034* (2015.01)

(58) Field of Classification Search
CPC ........... B29D 99/0039; B29L 2031/441; A47B 77/022; A47B 2077/027; A47B 96/18; A47B 96/201; A47B 2200/001; A47B 13/083; A47B 13/086; Y10T 156/1028; Y10T 156/103; Y10T 156/1031; Y10T 156/1034

See application file for complete search history.

(56) References Cited

U.S. PATENT DOCUMENTS

| | | |
|---|---|---|
| 4,636,443 A | 1/1987 | Jaisle et al. |
| 5,037,694 A | 8/1991 | Ungar et al. |
| 6,096,410 A | 8/2000 | Okajima et al. |

(Continued)

*Primary Examiner* — Carson Gross
(74) *Attorney, Agent, or Firm* — The Webb Law Firm

(57) ABSTRACT

A method of forming a laminate countertop with a curved edge profile extending around at least two adjacent sides thereof includes providing a base support having a top surface, a bottom surface, latitudinal sides, and longitudinal sides. At least one of the longitudinal sides includes the curved edge profile. The method further includes: adhering a laminate sheet to the base support to form a laminate cover over at least a portion of the top surface and a portion of the curved edge profile of the base support and mounting a preformed edge member having a curved edge profile to one of the sides of the base support to form a laminate countertop having curved edges extending around at least two sides thereof. To align the edge member and the base support, the preformed edge member is mounted to a brace to remove bowing or curvature from the preformed edge member.

18 Claims, 20 Drawing Sheets

(51) Int. Cl.
*B29D 99/00* (2010.01)
*B29L 31/44* (2006.01)

(56) References Cited

U.S. PATENT DOCUMENTS

| | | |
|---|---|---|
| 6,286,577 B1 | 9/2001 | Douglas et al. |
| 6,803,110 B2 | 10/2004 | Drees et al. |
| 7,754,120 B2 | 7/2010 | Kessing |
| 8,313,824 B2 | 11/2012 | Yokochi et al. |
| 2008/0245464 A1* | 10/2008 | Hazelwood .......... A47B 77/022 156/71 |

* cited by examiner

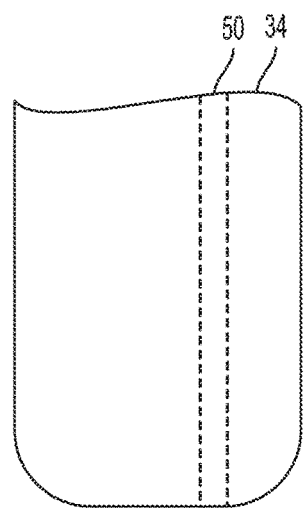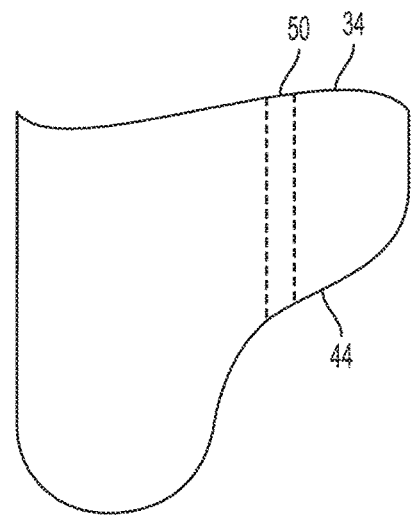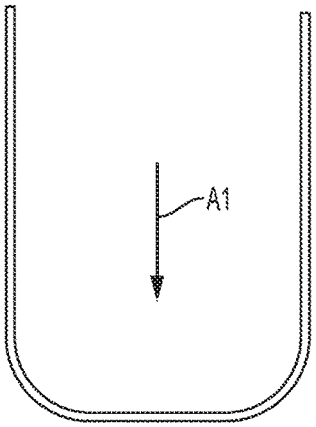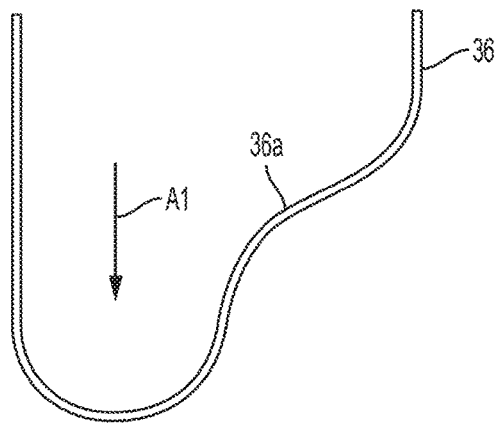
FIG. 8A    FIG. 8B

METHOD FOR FORMING A LAMINATE COUNTERTOP

BACKGROUND OF THE INVENTION

Field of the Invention

The invention relates generally to a method of forming a laminate countertop and, in particular, to a method of forming a laminate countertop having a curved edge profile extending around at least two adjacent sides of the countertop.

Description of Related Art

Countertops for kitchens, bars, workspaces, desks, and bathrooms can be made from a variety of natural and synthetic materials including natural stones, engineered stone and synthetic solid surface materials, and laminated constructions. Luxury and high-end installations often use natural stones, such as granite or marble, as such materials are believed to be more aesthetically pleasing than manmade alternatives. Countertops formed from synthetic solid surface materials such as engineered stone or Corian® manufactured by E.I. DuPont are also available at similar high-end price points. Solid surface materials are synthetic composite materials formed from a combination of natural stone dust (e.g., marble dust), acrylic polymers, epoxy or polyester resins, and similar materials. It is often used to produce a seamless countertop. For example, Corian® is a solid surface material formed from a cured mixture of acrylic polymer and alumina derived from, for example, bauxite ore.

Natural stone and solid surface countertops are generally believed to be more durable than laminate materials. In addition, natural stone and solid surface materials can also be molded or carved with a variety of ornate edge shapes which are also desired by consumers. For example, natural stone countertops are cut from stone slabs using computer controlled cutting machinery, as is known in the art. The computer-controlled machinery is capable of carving complex curved edge profiles on edges of the countertop. Countertops formed from synthetic solid surface materials can also be made with curved edge profiles, which can be formed by carving the synthetic solid surface material or by molding the curved edge profile during production of the synthetic material. Advantageously, carved or molded decorative edges can extend around adjacent sides of the countertop to create more aesthetically pleasing designs.

Construction grade and lower priced installations often use laminate countertops formed by laminating a curable resin sheet to a wood board or a wood composite substrate to form a countertop. Beneficially, such laminate countertops are easy to clean, generally non-porous to avoid staining, and can be manufactured in a wide variety of colors and texture patterns. Laminate countertops have been available for many years from numerous sources including The Diller Corporation under the Formica® brand name and WilsonArt Engineered Surfaces. Exemplary laminate countertops are described, for example, in U.S. Pat. No. 4,636,443 to Jaisle et al. entitled "Decorative Laminates and Method of Producing the Same" and in U.S. Pat. No. 6,286,577 to Douglas et al. entitled "Process for Fabricating Countertops", each of which is incorporated by reference in its entirety.

While laminate countertops are available in colors and designs which are made to resemble natural stone, several significant differences between natural or synthetic stone material countertops and laminate countertops mean that consumers can easily identify laminate countertops from more expensive alternatives. One obvious difference between laminate countertops and more expensive alternatives is the appearance of the edges of the countertop. Conventional laminate countertops are formed with a curved edge profile along a longitudinal side thereof. For example, a laminate countertop can be formed by forming a substrate or base support with the decorative curved edge profile and then adhering a flexible sheet of curable resin to the substrate such that the sheet presses against and adopts the curved edge profile of the longitudinal sides. However, due to the natural bend and flexibility of the sheet, the sheet cannot be bent over latitudinal sides of the base support. As such, latitudinal sides of laminate countertops are generally flat vertical surfaces covered by a separate piece of laminate material. The differences in edge profile between latitudinal and longitudinal sides of a countertop are especially noticeable for kitchen islands and similar structures which are positioned in a center of a room where all four sides of the countertop are easily visible.

For these reasons, there is a need for new laminate countertops and methods of forming laminate countertops that closely resemble more expensive natural stone and solid surface material alternatives. In particular, processes for constructing laminate countertops with color patterns and edge profiles that resemble natural stone would be desired by many consumers. The manufacturing methods and laminate countertops disclosed herein are configured to address these issues.

SUMMARY OF THE INVENTION

According to an example of the disclosure, a method of forming a laminate countertop with a curved edge profile extending around at least two adjacent sides thereof is provided. The method includes providing a base support having a top surface, a bottom surface, opposing latitudinal sides, and opposing longitudinal sides. At least one of the longitudinal sides includes a curved edge profile. The method further includes adhering a laminate sheet to the base support to form a laminate cover over at least a portion of the top surface and a portion of the curved edge profile of the base support and mounting a preformed edge member having a curved edge profile to one of the sides of the base support to form a laminate countertop having curved edges extending around at least two adjacent sides of the countertop. In order to align the preformed edge member and the base support, the preformed edge member is mounted to a brace to remove bowing or curvature from the preformed edge member. The brace includes at least a body portion having a curved longitudinal surface configured to be pressed against at least a portion of the curved edge profile of the preformed edge member and at least a hook for pulling the preformed edge member against the body of the brace to remove the bowing or curvature from the preformed edge member.

According to another example of the disclosure, a method of forming an edge member for a laminate countertop having a curved edge profile includes cutting the curved edge profile on a front side of a plug having a square or rectangular cross section; stamping a flexible laminate sheet by pressing a die having the curved edge profile against the sheet to produce a pre-stamped laminate cover having the curved edge profile; adhering the laminate cover to the curved edge profile of the plug using an adhesive; attaching a brace to the plug and to the laminate cover to hold the laminate cover against the plug in a desired position; and after the adhesive cures and while the brace remains attached to the plug and laminate cover, making a longitudinal cut along a rear side of the plug to form a preformed edge member of a desired thickness.

According to another example of the disclosure, a laminate countertop having a curved edge profile extending around at least three sides of the countertop includes a base support having a top surface, a bottom surface, opposing longitudinal sides, at least one of which comprises the curved edge profile, and opposing latitudinal sides. The countertop further includes a laminate cover formed from a cured resin material adhered to and covering at least a portion of the top surface and at least a portion of the curved edge profile of the base support. The method also includes at least one preformed edge member having the curved edge profile connected to at least one of the latitudinal sides of the base support to form the edge profile extending around the at least three sides of the countertop. In some examples, the preformed edge member includes a plug having an upper lip, a lower lip, and a central portion between the upper and lower lips. An outer surface of the upper lip can include the curved edge profile. The preformed edge member also includes a pre-stamped laminate cover formed from the cured resin material stamped in the curved edge profile adhered to the outer surface of the upper lip of the plug.

Non-limiting examples of the present invention will now be described in the following numbered clauses:

Clause 1: A method of forming a laminate countertop with a curved edge profile extending around at least two adjacent sides thereof, the method comprising: providing a base support comprising a top surface, a bottom surface, opposing latitudinal sides, and opposing longitudinal sides, wherein at least one of the longitudinal sides comprises a curved edge profile; adhering a laminate sheet to the base support to form a laminate cover over at least a portion of the top surface and a portion of the curved edge profile of the base support; and mounting a preformed edge member comprising a curved edge profile to one of the sides of the base support to form a laminate countertop having curved edges extending around at least two adjacent sides of the countertop, wherein, in order to align the preformed edge member and the base support, the preformed edge member is mounted to a brace to remove bowing or curvature from the preformed edge member, and wherein the brace comprises at least a body portion having a curved longitudinal surface configured to be pressed against at least a portion of the curved edge profile of the preformed edge member, and at least a hook for pulling the preformed edge member against the body of the brace to remove the bowing or curvature from the preformed edge member.

Clause 2: The method of clause 1, wherein the base support is between about 40 inches and about 60 inches wide.

Clause 3: The method of clause 1 or clause 2, further comprising forming a backsplash by folding a portion of the base support and laminate cover adjacent to one of the longitudinal sides to form a substantially vertical surface relative to the top surface of the base support.

Clause 4: The method of any of clauses 1 to 3, wherein the base support comprises a wood board or a composite material formed from a laminate of wood material, and wherein the base support has a thickness of between about 0.5 inch and 2.0 inches.

Clause 5: The method of any of clauses 1 to 4, wherein the curved edge profile comprises a decorative profile comprising at least two convexly curved portions.

Clause 6: The method of clause 5, wherein the curved edge profile further comprises a flat vertical or angled surface between the convexly curved portions.

Clause 7: The method of any of clauses 1 to 6, wherein the edge member has a longitudinal length of between about 40 inches and about 60 inches, and preferably about 50 inches.

Clause 8: The method of any of clauses 1 to 7, wherein mounting the brace to the edge member comprises inserting a portion of the hook into a corresponding hole on a bottom surface of the edge member and tightening the hook to draw the edge member toward the body portion of the brace.

Clause 9: The method of any of clauses 1 to 8, further comprising forming the preformed edge member prior to mounting the preformed edge member to the base support, wherein forming the preformed edge member comprises: cutting the curved edge profile on a front side of a plug having a square or rectangular cross section; stamping a flexible laminate sheet by pressing a die having the curved edge profile against the sheet to produce a pre-stamped laminate cover having the curved edge profile; adhering the pre-stamped laminate cover to the curved edge profile of the plug using an adhesive; attaching a brace to the plug and to the laminate cover to hold the laminate cover against the plug in a desired position; and after the adhesive dries or cures and while the brace remains attached to the plug and laminate cover, making a longitudinal cut along a rear side of the plug to form a preformed edge member of a desired thickness.

Clause 10: The method of clause 9, wherein the adhesive comprises an epoxy resin.

Clause 11: The method of clause 9 or clause 10, wherein stamping the flexible laminate sheet comprises heating the sheet to increase flexibility of the sheet prior to pressing the die against the sheet.

Clause 12: The method of any of clauses 9 to 11, further comprising, prior to adhering the laminate cover to the plug, drilling a plurality of weep holes extending between front and rear sides of the plug for receiving excess adhesive.

Clause 13: The method of any of clauses 9 to 12, wherein the plug comprises a wood board or a composite board formed from a laminate wood material.

Clause 14: The method of any of clauses 9 to 13, further comprising, after making the longitudinal cut, cutting latitudinal sides of the edge member at an angle relative to a longitudinal axis of the plug so that the edge member can be connected to the base support.

Clause 15: The method of any of clauses 9 to 14, wherein making the longitudinal cut comprises cutting a groove from the rear side of the plug to form a plug comprising an upper lip, a lower lip, and a central portion between the upper and lower lips Clause 16: The method of clause 15, wherein an angle between an inwardly directed surface of the upper lip and a top surface of the lower lip is between about 60 degrees and 100 degrees.

Clause 17: The method of clause 15 or clause 16, wherein cutting the groove from the rear side of the plug comprises cutting a first cut with a first rotating saw blade followed by cutting a second cut with a second rotating saw blade.

Clause 18: The method of clause 17, wherein the first cut is a substantially vertical cut and the second cut is a substantially horizontal cut.

Clause 19: A method of forming an edge member for a laminate countertop having a curved edge profile, comprising: cutting the curved edge profile on a front side of a plug having a square or rectangular cross section; stamping a flexible laminate sheet by pressing a die having the curved edge profile against the sheet to produce a pre-stamped laminate cover having the curved edge profile; adhering the laminate cover to the curved edge profile of the plug using an adhesive; attaching a brace to the plug and to the laminate cover to hold the laminate cover against the plug in a desired position; and after the adhesive cures and while the brace remains attached to the plug and laminate cover, making a longitudinal cut along a rear side of the plug to form a preformed edge member of a desired thickness.

Clause 20: The method of clause 19, wherein stamping the flexible laminate sheet comprises heating the sheet to increase flexibility of the sheet prior to pressing the stamp against the sheet.

Clause 21: The method of clause 19 or clause 20, further comprising, after making the longitudinal cut, cutting latitudinal sides of the edge member at an angle relative to a longitudinal axis of the plug so that the edge member can be connected to a countertop.

Clause 22: The method of any of clauses 19 to 21, wherein the brace comprises a body portion having the curved edge profile configured to be pressed against an outer surface of the pre-stamped laminate cover and at least a hook configured to pull the plug toward the body portion of the brace.

Clause 23: The method of clause 22, wherein attaching the brace to the plug comprises inserting a portion of the hook into a corresponding hole on a bottom surface of the plug and tightening the hook to draw the plug toward the body portion of the brace.

Clause 24: A laminate countertop having a curved edge profile extending around at least three sides of the countertop, comprising: a base support comprising a top surface, a bottom surface, opposing longitudinal sides, at least one of which comprises the curved edge profile, and opposing latitudinal sides; a laminate cover formed from a cured resin material adhered to and covering at least a portion of the top surface and at least a portion of the curved edge profile of the base support; and at least one preformed edge member having the curved edge profile connected to at least one of the latitudinal sides of the base support to form the edge profile extending around the at least three sides of the countertop, the preformed edge member comprising: a plug comprising an upper lip, a lower lip, and a central portion between the upper and lower lips, wherein an outer surface of the upper lip comprises the curved edge profile; and a pre-stamped laminate cover formed from the cured resin material stamped in the curved edge profile adhered to the outer surface of the upper lip of the plug.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

FIG. 8A is a schematic drawing of an edge support and a stamped laminate cover of the countertop of FIG. 1A prior to forming an edge member according to an aspect of the disclosure;

FIG. 8B is a schematic drawing of an edge support and a stamped laminate cover of the countertop of FIG. 1B prior to forming an edge member according to an aspect of the disclosure;

DETAILED DESCRIPTION

Figure 1A:
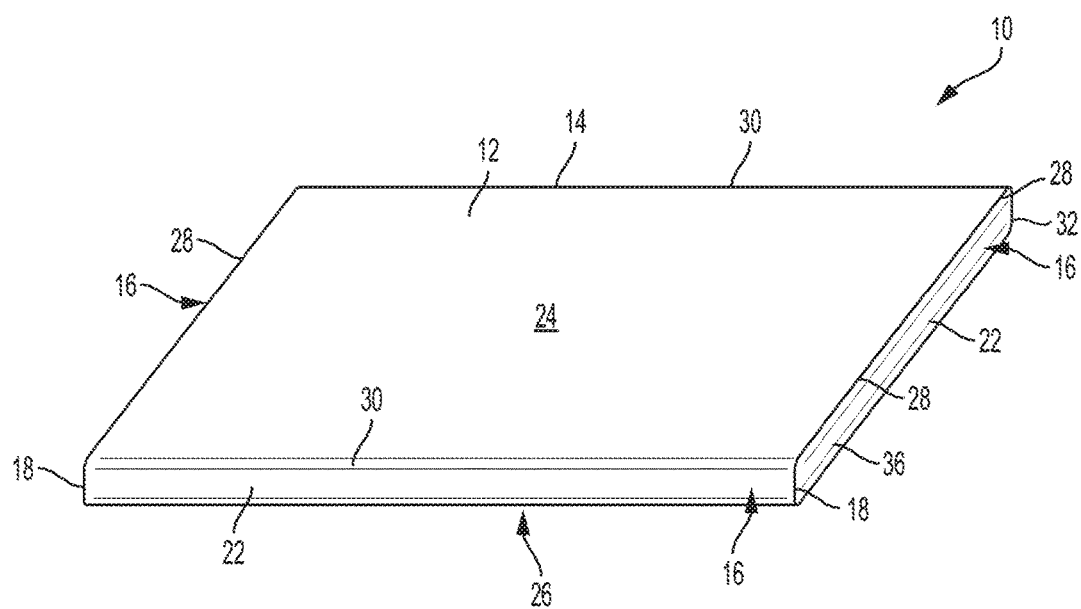
FIG. 1A is a perspective view of a laminate countertop with a curved edge profile according to an aspect of the disclosure.
Figure 1B:
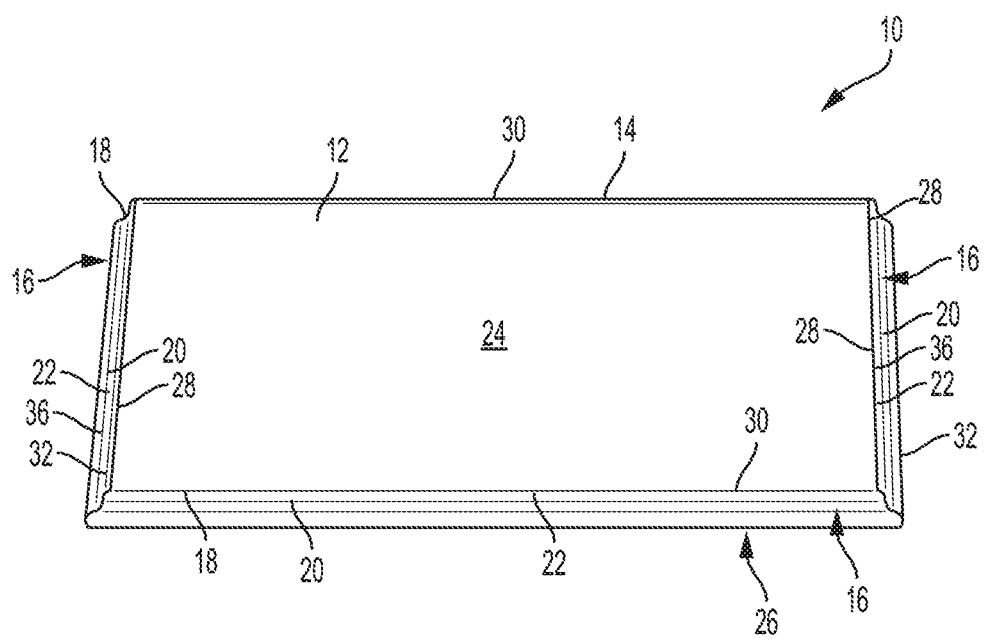
FIG. 1B is a perspective view of another example of a laminate countertop with another example of a curved edge profile according to an aspect of the disclosure.
Figure 2A:
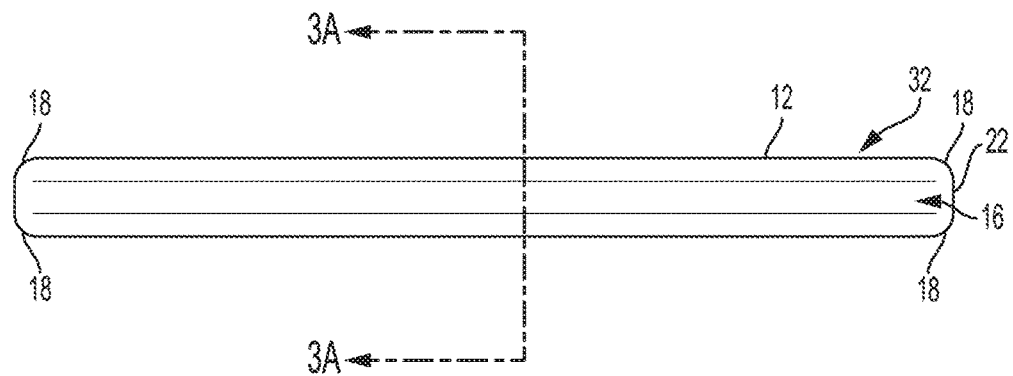
FIG. 2A is a side view of the laminate countertop of FIG. 1A.
Figure 2B:
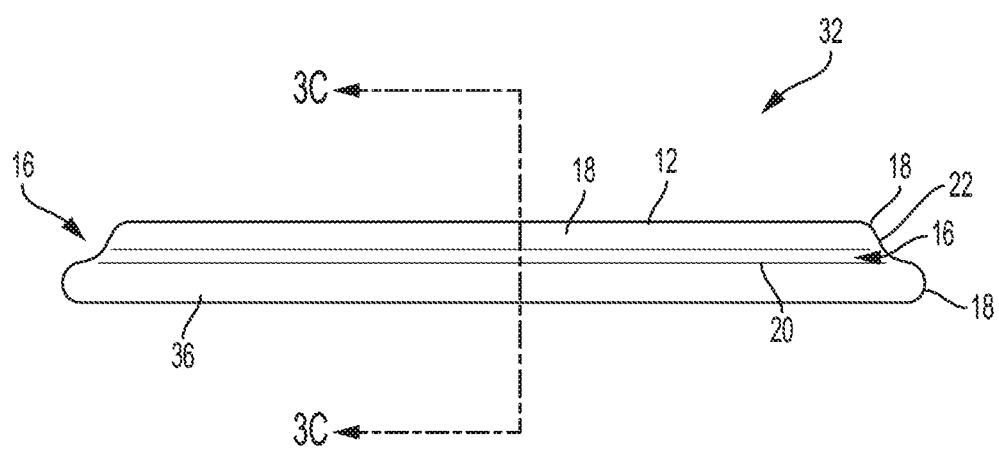
FIG. 2B is a side view of the laminate countertop of FIG. 1B.

As used herein, the singular form of "a", "an", and "the" include plural referents unless the context clearly dictates otherwise. For the purposes of this specification, unless otherwise indicated, all numbers expressing quantities of ingredients, reaction conditions, dimensions, physical characteristics, and so forth used in the specification and claims are to be understood as being modified in all instances by the term "about."

As used herein, the terms "right", "left", "top", and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in-between, e.g., 1 to 6.3, or 5.5 to 10, or 2.7 to 6.1.

A laminate countertop 10 and method of forming a laminate countertop 10 are disclosed herein. The invented laminate countertop resembles countertops formed from natural stone materials or synthetic solid surface materials. For example, the laminate countertops 10 disclosed herein can be formed with color and texture patterns that resemble natural stone. The countertops 10 can also include decorative edges extending around at least two adjacent sides of the countertop. As used herein, a laminate countertop material refers to a flexible polymer material formed as a sheet. The sheet can be formed from a combination of paper or textile material encapsulated by and/or impregnated with a polymer resin material (e.g., melamine resin). The paper or textile sheet and polymer resin are cured to form a flexible sheet for use as a countertop. Desirably, such sheets are substantially non-porous to avoid staining and sufficiently impenetrable to water so that the surface can be cleaned by hand using, for example, a wet sponge. Formica® laminate sheets manufactured by the Dilller Corporation, of Cincinnati, Ohio are an example of a plastic sheet commonly used for laminate countertops. Laminate countertops are also available from WilsonArt and other sources.

The manufacturing process disclosed herein can easily be adapted for large scale commercial production. For example, a laminate cover 12 can be adhered to a base substrate or support 14 using a conveyor belt or roller assembly for guiding the support 14 and cover 12 through a laminating machine, such that the laminate cover 12 is adhered to the support 14 with a single pass through the machine. Decorative edges on latitudinal sides of the countertop are added after the laminate cover is adhered to the base support. Some or all of the manufacturing processes disclosed herein can also be automated to increase efficiency and/or to reduce costs.

The manufacturing processes disclosed herein are also selected so that imperfections, seams, and other inconsistencies are hidden from view to the extent possible. For example, an entire countertop section can be formed from a single sheet of laminate material so that the number of seams in a finished countertop arrangement is as small as possible. If seams are needed for a particular countertop arrangement they should be positioned away from high traffic or commonly used areas of the countertop so that the seams will not be noticeable once the countertop is installed. Finally, the techniques disclosed herein are intended to produce a countertop 10 manufactured within tight tolerances and so that different portions of the countertop 10 align well with a minimum of gaps, overlaps, misalignments, and other inconsistencies which would allow viewers to recognize that a countertop is manufactured from a laminate material and not from natural stone or synthetic solid materials.

Countertop Assembly

With reference to FIGS. 1A-3D, different examples of a four-sided laminate countertop 10 having a curved edge profile extending around at least two adjacent sides of the countertop is illustrated. A curved edge profile, generally identified as edge profile 16, refers to a decorative edge profile that includes a combination of curved portions 18, grooves 20, and flat or angled surfaces 22. Specifically, FIGS. 1A, 2A, 3A, and 3B depict an exemplary countertop 10 with a curved edge profile comprising a flat substantially vertical surface extending between convex edges. FIGS. 1B, 2B, 3C, and 3D depict an exemplary countertop 10 with curved edges connected by a horizontal or slightly angled flat surface.

Traditionally curved portions are carved into wood or stone materials. For example, a router can be used to carve a curved edge profile 16 onto a piece of wood. Similar carving machinery can be used for carving edge profiles for natural stone slabs. The curved edge profile 16 extends around sides of the countertop 10 such that curved portions on adjacent sides of the countertop extend around corners of the countertop 10 to form continuous or substantially continuous grooves 20 extending around the completed countertop. In examples of a laminate countertop described herein, adjacent sides of the countertop 10 may be formed from different pieces of material (e.g., different pieces of wood or laminate) joined together to form the countertop 10. For example, as shown in FIGS. 1A-3D, the separate pieces are aligned within acceptable tolerances such that the curved portion or edge profile appears to extend from one side of the countertop to adjacent side(s) of the countertop 10.

Generally, the four-sided countertop 10 includes the base support 14 which includes a top surface 24, a bottom surface 26 (shown in FIGS. 3A-3D), opposing latitudinal sides 28, and opposing longitudinal sides 30. The base support 14 can be formed from one or more wood boards or from a composite formed from a laminated wood material, such as plywood. The base support 14 can be about 0.5 inch to 2.0 inches thick, preferably about 0.75 inch thick. The base support 14 may also include additional boards or substrates extending from the longitudinal sides of the base support 14 to form the decorative edges. In some examples, the base support 14 is about 40 inches to 60 inches wide and, preferably about 50 inches wide. The base support can be any longitudinal length needed for a particular installation. Preformed countertops 10 can also be available at preselected lengths of, for example, 6 ft., 8 ft., 10 ft., 12 ft., or more.

Figure 4:
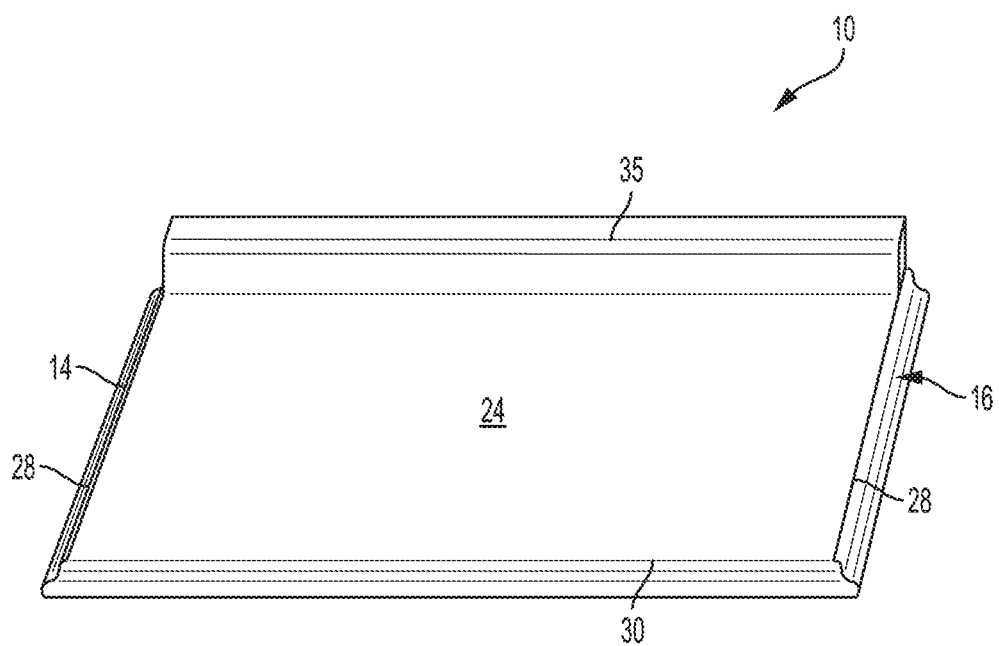
FIG. 4 is a perspective view of another embodiment of a countertop according to an aspect of the disclosure.

At least one of the longitudinal sides 30 of the base support 14 includes or defines the curved edge profile 16. As discussed herein, in some examples, all four sides of the countertop 10 can have the curved edge profile 16, as would be used with a countertop for a kitchen island or bar top. In other examples, three sides of the countertop 10 can include the curve edge profile 16. The other side can be flat if, for example, the flat side is intended to be positioned against a wall. As shown in FIG. 4, in some examples, a countertop 10 includes a curved edge profile 16 extending around portions of three sides of the countertop 10. For example, the countertop can include only one longitudinal side 30 having the curved edge profile 16. The countertop 10 can also include curved edge profiles 16 extending along portions of both latitudinal sides 28 of the countertop 10. A fourth side of the countertop 10 may be bent at a 90 degree angle relative to a top surface 24 of the countertop 10 to form a backsplash 35, as shown in FIG. 4. The backsplash 35 is configured to be positioned against a wall as is known in the art. In some examples, a top edge 35 of the backsplash 35 can also have a curved edge profile. In some examples, the curved edge profile of the backsplash can be the same pattern as the other sides of the countertop. In other examples, the curved edge profile on the backsplash can be a different pattern.

With reference again to FIGS. 1A-3D, the countertop also includes the laminate cover 12 formed from a cured resin material adhered to and covering at least a portion of the top surface 24 and at least a portion of the curved edge profile 16 of the base support 14. Laminate covers are generally formed from polymer resin materials, which may also include textile or paper layers. The laminate cover 12 is generally a flexible sheet having a thickness of 0.2 inch or less, and preferably about 0.05 inch or less. The laminate cover 12 can include a drawn, printed, or painted decorative pattern or design on an outer surface thereof. The pattern can be a stone pattern selected so that the countertop appears to resemble natural stone. The outer surface of the laminate cover 12 can also have a wood grain pattern or may be a solid color. Exemplary laminate materials which can be adhered to a based or substrate and used to form a countertop for a kitchen or bathroom are described, for example, in the following patents: U.S. Pat. Nos. 5,037,694; 6,096,410; 6,803,110; 8,313,824; and U.S. Pat. No. 7,754,120, each of which is incorporated by reference in its entirety.

The countertop 10 also includes at least one preformed edge member generally shown by number 32 having the curved edge profile 16 connected to at least one of the latitudinal sides of the base support 14 to form the edge profile extending around the at least two adjacent sides of the countertop 10. The preformed edge member 32 includes an edge support or plug 34 (shown in FIGS. 3A-3D) and a pre-stamped laminate cover 36 formed from the same or a similar material as the laminate cover 12 adhered to the base support 14. For example, the pre-stamped laminate cover 36 may be the same design and/or color pattern as the laminate cover 12 on the base support 14. The design on the pre-stamped laminate cover 36 of the edge member 32 may also be positioned to line up with the laminate cover 12 on the base support 14 so that, for example, grain or stone layers appear to line up.

In some examples, the edge member 32 has a height H1 (shown in FIGS. 3B and 3D) of between 1.0 inch and 3.0 inches and a maximum width W1 (shown in FIGS. 3B and 3D) of between 1.0 inch and 2.0 inches. In some examples, as shown in FIG. 3B, a portion of the edge member 32, such as lower lip 40, is connected under the substrate 14. In that case, the edge member 32 extends beyond a periphery of the substrate by a distance W2 (shown in FIG. 3B), which is less than the total width W1 of the edge member 32. In such an embodiment, the width W2 can be less than 1 inch and, preferably, less than 0.5 inches. Further, in order to reduce visibility of seams in the finished countertop 10, it is desirable that the seam between the top of the laminate cover 12 on the substrate 14 and the laminate cover 36 of the edge member 32 is positioned on a curved or angled portion of the finished countertop 10. Seams in flat surfaces are more conspicuous than seams on curved surfaces. Therefore, as shown in FIGS. 3B and 3D, an outer surface of the laminate cover 36 is not co-planar with a surface of the laminate cover 12 of the substrate 14. For example, as shown schematically in FIGS. 3B and 3D, the outer surface of the laminate cover 36 of the edge member 32 curves away from a line L1, which represents the planar surface of the laminate cover 12. The outer surface of the laminate cover 35 is not co-extensive with line L1 along any portion of the outer surface of the laminate cover 36.

In some examples, the plug 34 used to form the edge member 32 is about 40 inches to 60 inches wide, and preferably about 50 inches wide. The plug 34 can be about 1.0 to about 3.0 inches in height and depth. The plug 34 is formed from the same or from a similar material as the base support 14. For example, the plug 34 can be formed from a wood board or wood composite material. In some examples, the plug 34 has a substantially L-shaped or V-shaped cross section, as shown in FIG. 5. In other examples, a rectangular cross section may be used provided that such a shape can be easily mounted to the latitudinal side 28 of the base support 14.

As described in further detail herein, the size and shape of the plug 34 are selected to address problems caused by bowing or bending of the plug 34 as a result of a natural bias of the laminate material. In particular, the laminate cover 12 naturally biases to a rolled or curved position. As such, if the plug 34 were too thin or flexible, the edge member 32 including the plug 34 would bow causing the laminate cover 36 to pull away from the plug 34. Bowing would also make it more difficult to correctly attach the edge member 32 to the base support 14.

In some examples, the pre-stamped edge member 32 includes weep holes 50 drilled from the through the top inwardly directed or rear surface 46 of the upper lip 38. The weep holes 50 are positioned to direct excess flowable adhesive, such as epoxy resin, away from a space between the pre-stamped laminate cover 36 and the plug 34 so that adhesive is evenly distributed on the plug 34. For example, pressing the plug 34 into the pre-stamped laminate cover 36 can cause flowable adhesive to flow into the weep holes 50 to remove excess adhesive. The edge member 32 can also include a longitudinally extending adhesive channel 62 sized to receive adhesive for mounting the edge member 32 to other portions of the countertop 10. The channel 62 can be formed by any suitable woodworking technique including, for example, with a router, saw blade, power sanding device, or similar electronic device for forming grooves or channels in wood and composite particle board materials.

The edge member 32 can also include brace holes 52 positioned on a bottom surface 54 of the lower lip 40 of the plug 34. The brace holes 52 can be drilled through the laminate cover 36. The brace holes 52 are spaced longitudinally along the edge member 32. As described herein, hook portions 112 of a brace 110 (shown in FIGS. 9A-9D) are inserted into the brace holes 52. Tightening the hooks 112 draws the brace 110 against the pre-stamped laminate cover 36 and plug 34 to allow adhesive for adhering the pre-stamped laminate cover 36 to the plug 34 to dry. As shown in FIGS. 9A-9D, the hooks 112 are substantially horizontal relative to the brace 110. In other examples, the hooks 112 can extend from the brace 110 at an angle of about 10 degrees, 15, degrees, or any angle relative to the horizontal.

Figure 3A:
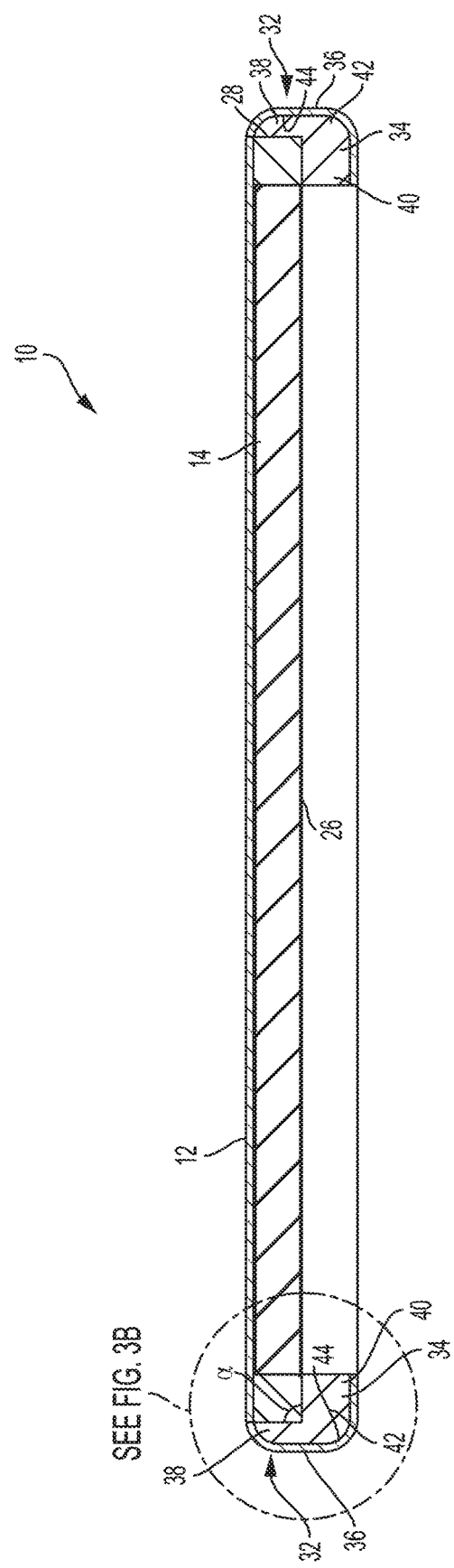
FIG. 3A is a cross-sectional view of the laminate countertop of FIG. 2A taken along line 3A-3A.
Figure 3B:
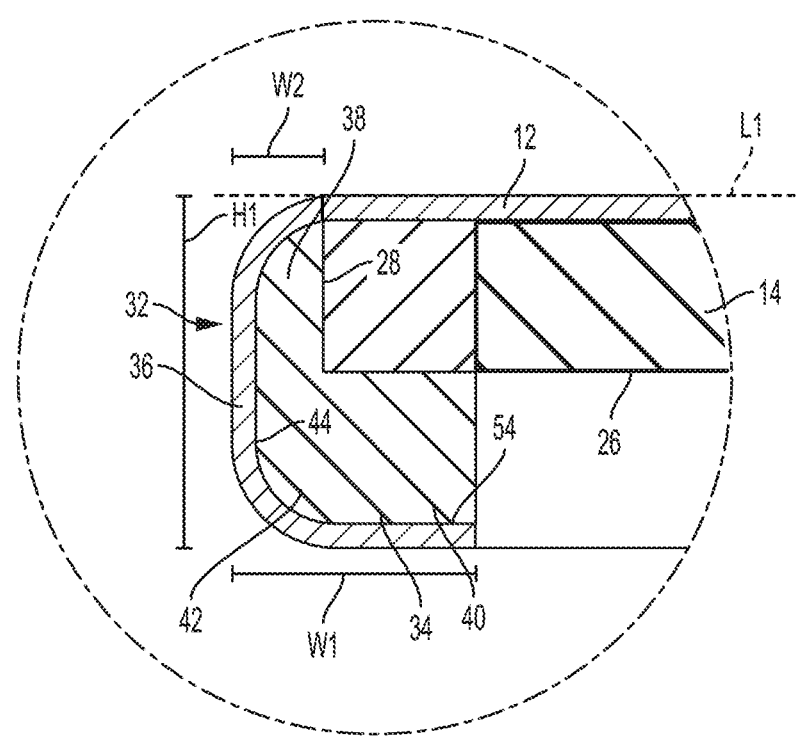
FIG. 3B is an enlarged cross-sectional view of a portion of the countertop of FIG. 3A.
Figure 5A:
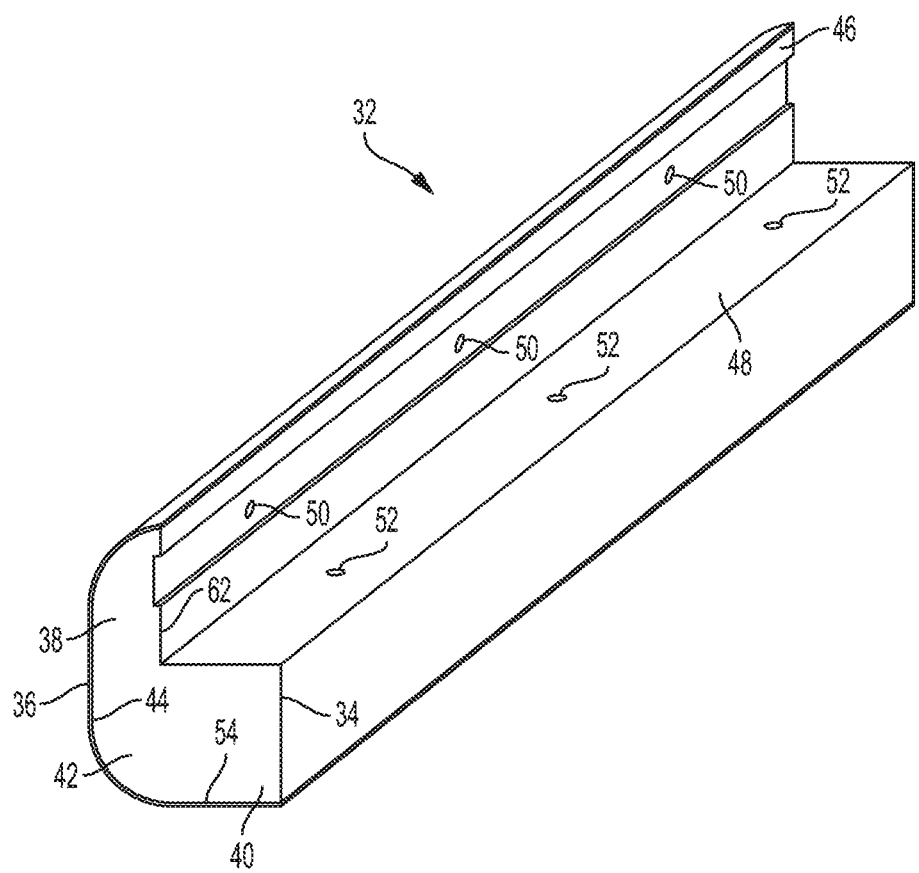
FIG. 5A is a perspective view of an edge member of the countertop of FIG. 1A according to an aspect of the disclosure.

As shown in FIGS. 3A, 3B, and 5A in some examples, the plug 34 can include an upper lip 38, a lower lip 40, and a central portion 42 extending between the upper lip 38 and the lower lip 40. An outer surface 44 of the upper lip 38 comprises the curved edge profile 16. The lips 38, 40 can be integrally formed with the central portion 42. In other examples, the lips 38, 40 are separate structures joined together by, for example, an adhesive and/or mechanical fasteners, such as screws, nails, or staples. In some examples, an angle α between an inwardly directed surface or rear surface 46 of the upper lip 38 and a top surface 48 of the lower lip 40 is between about 60 degrees and 100 degrees as shown by angle α in FIG. 5A. The lips 38, 40 of the plug 34 can be attached to a latitudinal side 28 and/or bottom surfaces 26 of the base support 14 to form a reliable connection between the base support 14 and the plug 34 of the preformed edge member 32. For example, the inwardly directed surface or rear surface 46 of the upper lip 38 of the plug 34 can be positioned to contact a substantially vertical surface of the latitudinal side 28 of the base support 14 and the top surface 48 of the lower lip 40 can be positioned to contact the bottom surface 26 of the base support 14 as shown in FIG. 3B.

Figure 3C:
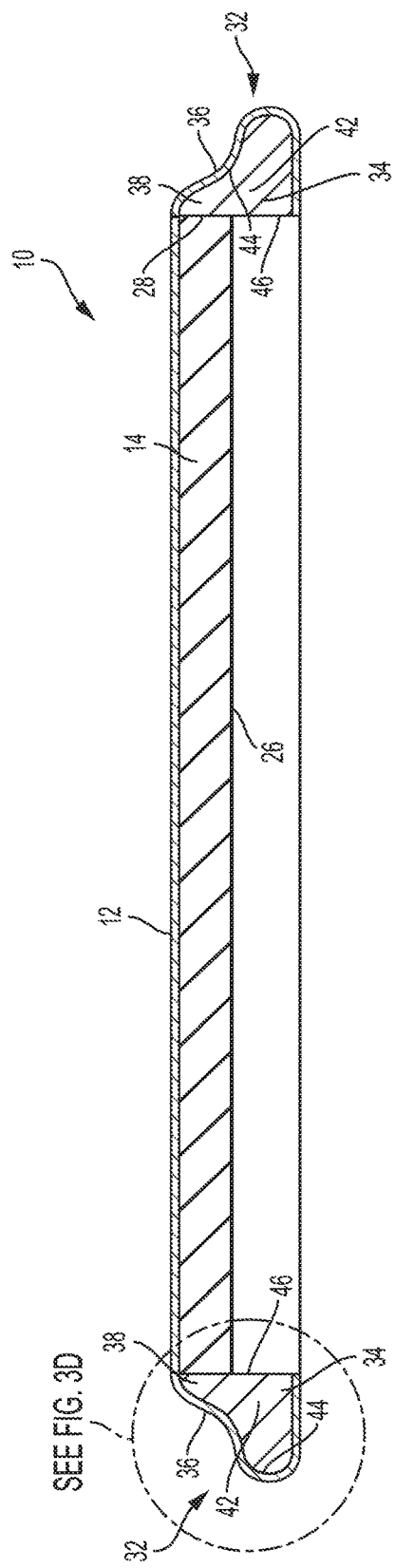
FIG. 3C is a cross-sectional view of the laminate countertop of FIG. 2B taken along line 3C-3C.
Figure 3D:
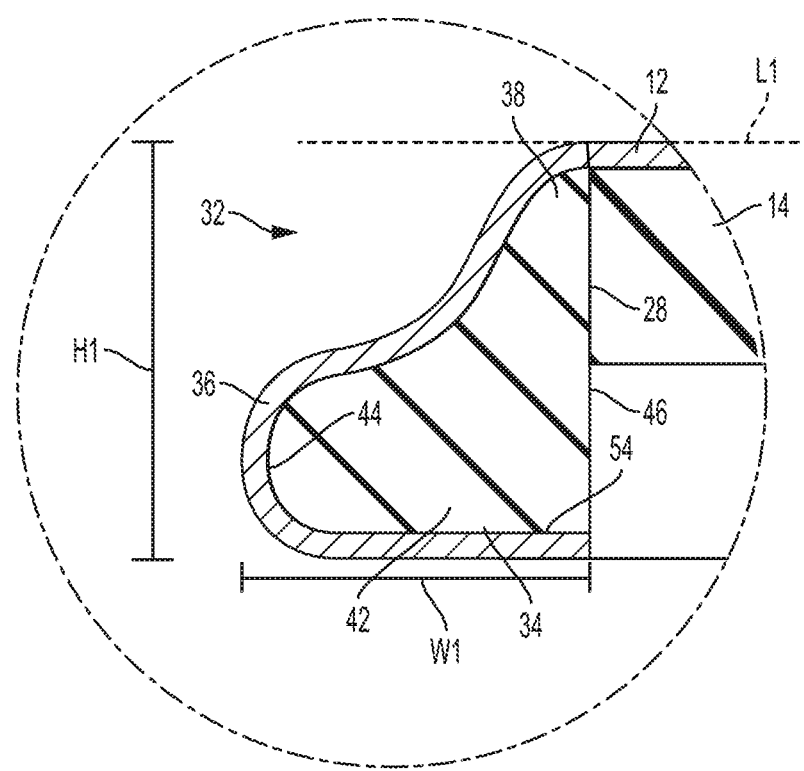
FIG. 3D is an enlarged cross-sectional view of a portion of the countertop of FIG. 3B.
Figure 5B:
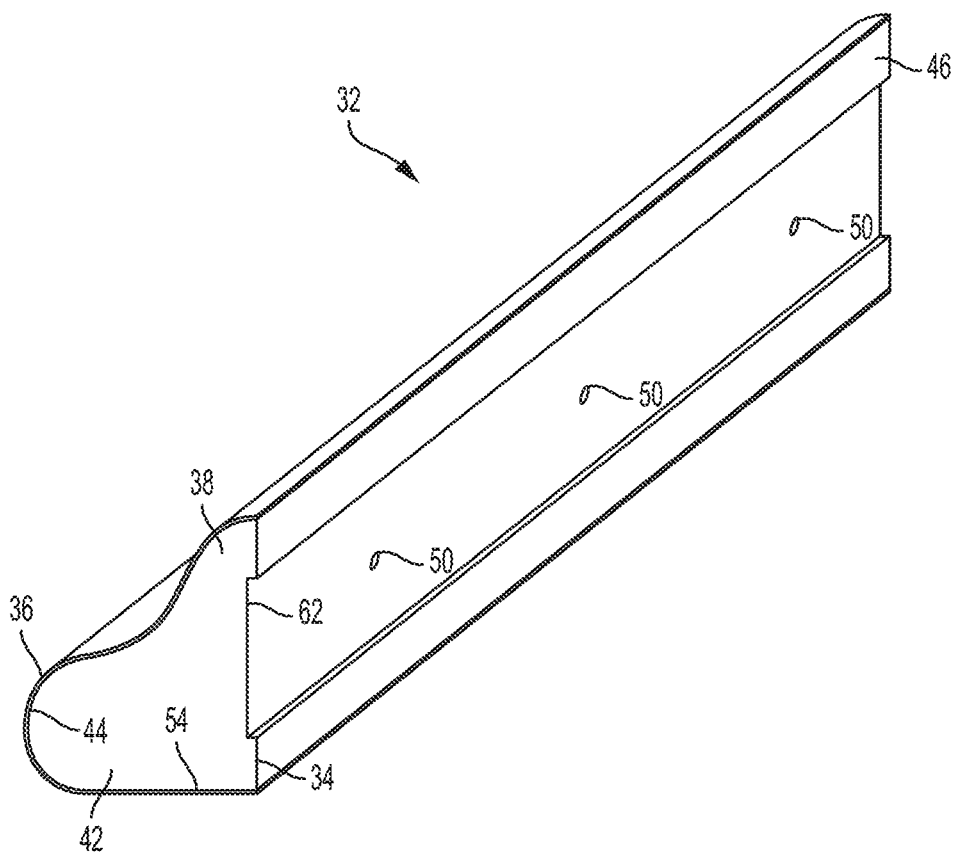
FIG. 5B is a perspective view of an edge member of the countertop of FIG. 1B according to an aspect of the disclosure.

With reference to FIGS. 3C, 3D, and 5B, another exemplary arrangement of the plug 34 and laminate cover 36 is illustrated. In this example, the plug 34 includes only a central portion 42 and an upper portion 38, which form a substantially vertical inwardly directed or rear surface 46. The plug 34 defines a curved edge profile 16 including multiple curved portions connected together through an angled surface or groove. The plug 34 can be connected to the base support 14 in a similar manner to previously described examples. For example, the surface 46 can be mounted to the base support 14 using an adhesive or mechanical fastener as are known in the art.

Figure 6A:
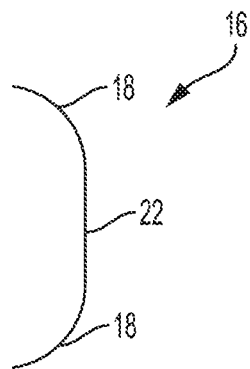
FIG. 6A is a schematic drawing of a curved edge profile according to an aspect of the disclosure.

An exemplary curved edge profile 16 that can be used with a laminate countertop of the present disclosure is shown in FIG. 6A. As previously described, the curved edge profile 16 is a decorative profile including the curved portions 18, one or more grooves 20, and flat or angled surfaces 22 selected to produce a visually appealing edge for use in kitchens, bathrooms, and similar uses. Further, the curved edge profile 16 should be easy to manufacture using commercial wood working, laminating, and stamping machines. In some simpler examples, the curved edge profile 16 may be a single convex curve extending around the periphery of the base support. In other examples, the curved edge profile 16 can include combinations of curved portions, flat or angled surfaces, and grooves extending around portions of the countertop surface. The curved edge profile 16 of FIG. 6A is generally C-shaped having convexly curved portions 18 extending along a periphery of the curved edge profile 16. A substantially flat vertical surface 22 extends between the curved portions 18 forming the C-shape curved edge profile 16.

Figure 6B:
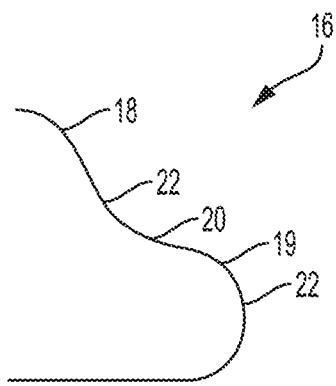
FIG. 6B is a schematic drawing of a curved edge profile according to another aspect of the disclosure.

Another exemplary curved edge profile 16 that can be used with a laminate countertop of the present disclosure is shown in FIG. 6B. As shown in FIG. 6B, the curved edge profile 16 includes a first convexly curved portion 18 configured to be adjacent to the top surface 24 of the countertop 10 and a second convexly curved portion 19 configured to be positioned adjacent to the bottom surface 26 of the countertop 10. The curved edge profile 16 also includes the angled surface 22 extending between the first and second curved portions 18, 19 of the curved edge profile 16. Other arrangements of curved portions, flat surfaces, and grooves can also be used with the edge members 32 and countertops 10 of the present disclosure within the scope of the invention.

Manufacturing Processes

Figure 7:
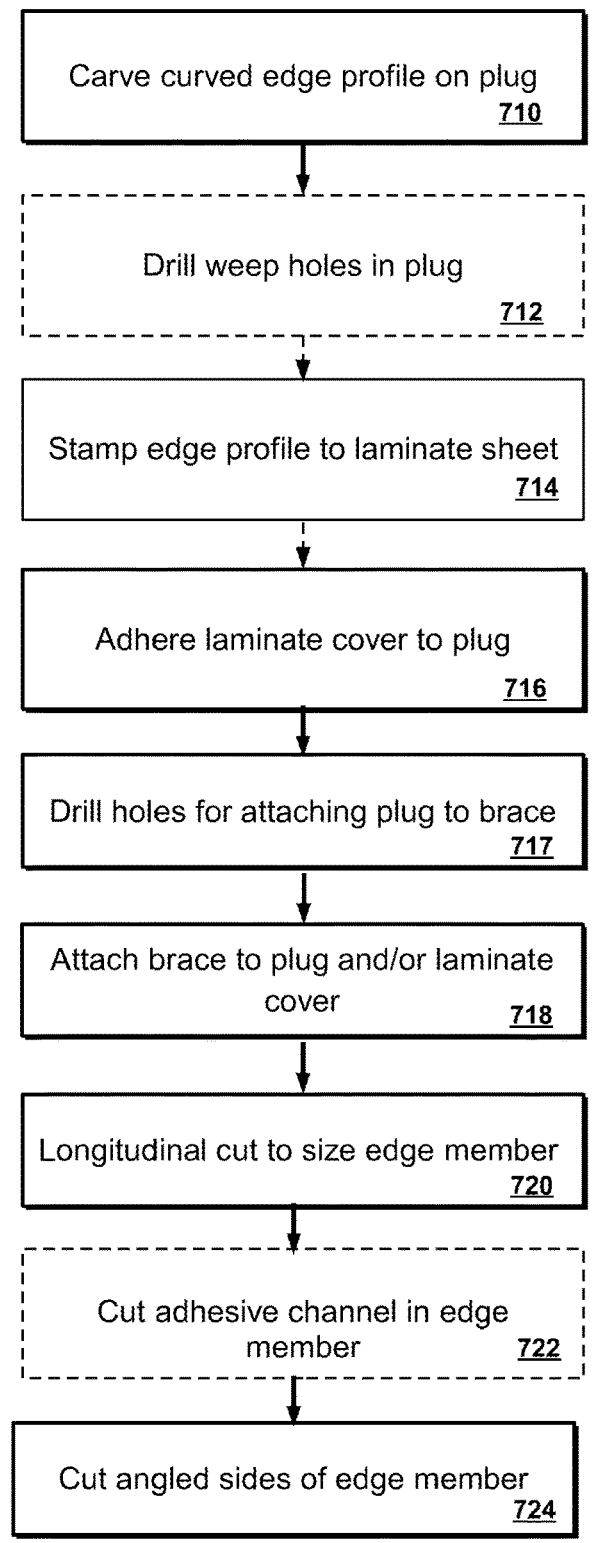
FIG. 7 is a flow chart showing steps for manufacture of an edge member according to an aspect of the disclosure.
Figure 9A:
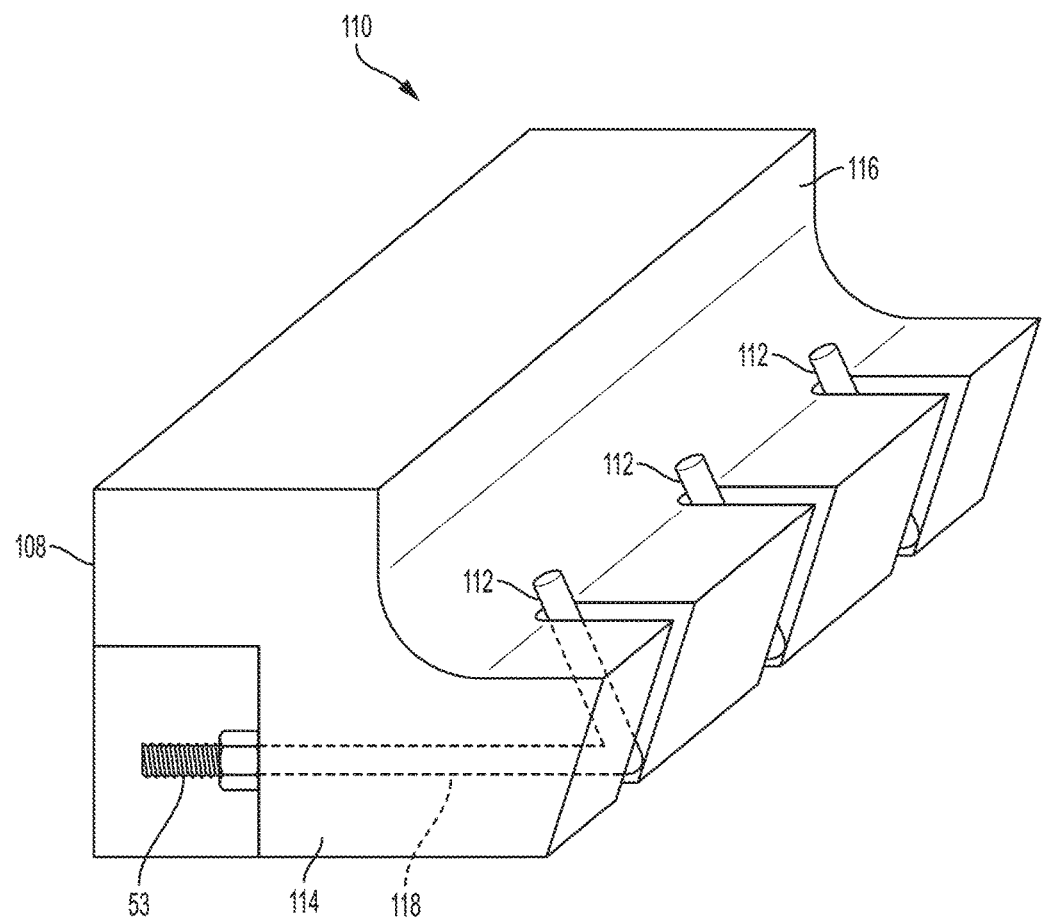
FIG. 9A is a perspective view of a brace for mounting a plug to a pre-stamped laminate cover for forming an edge member of the countertop of FIG. 1A according to an aspect of the disclosure.
Figure 9B:
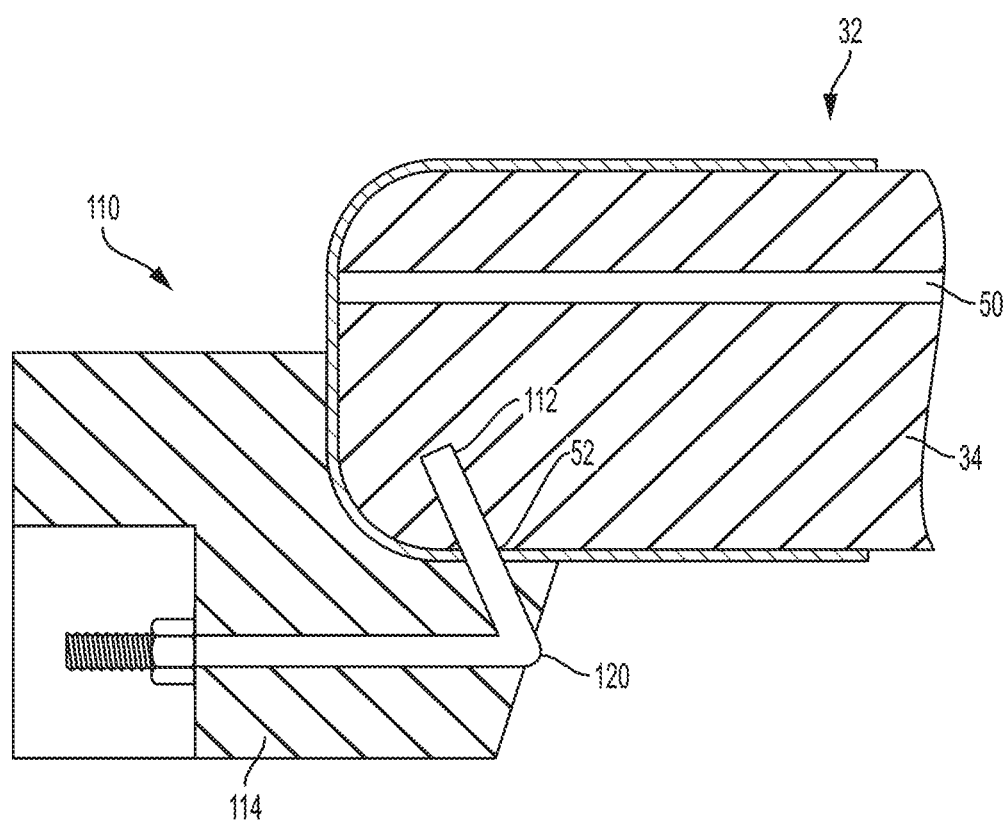
FIG. 9B is a schematic drawing of a cross-sectional view of the edge member and brace of FIG. 9A according to an aspect of the disclosure.
Figure 9C:
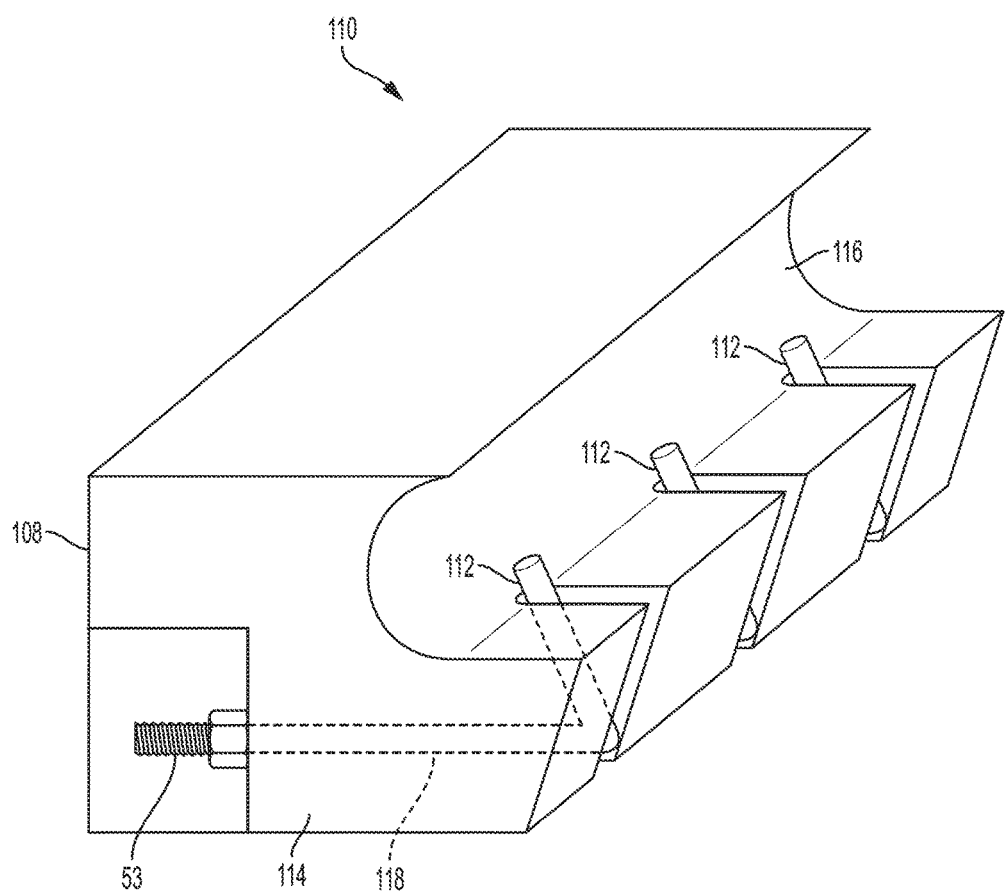
FIG. 9C is a perspective view of a brace for mounting a plug to a pre-stamped laminate cover for forming an edge member of the countertop of FIG. 1B according to an aspect of the disclosure.
Figure 9D:
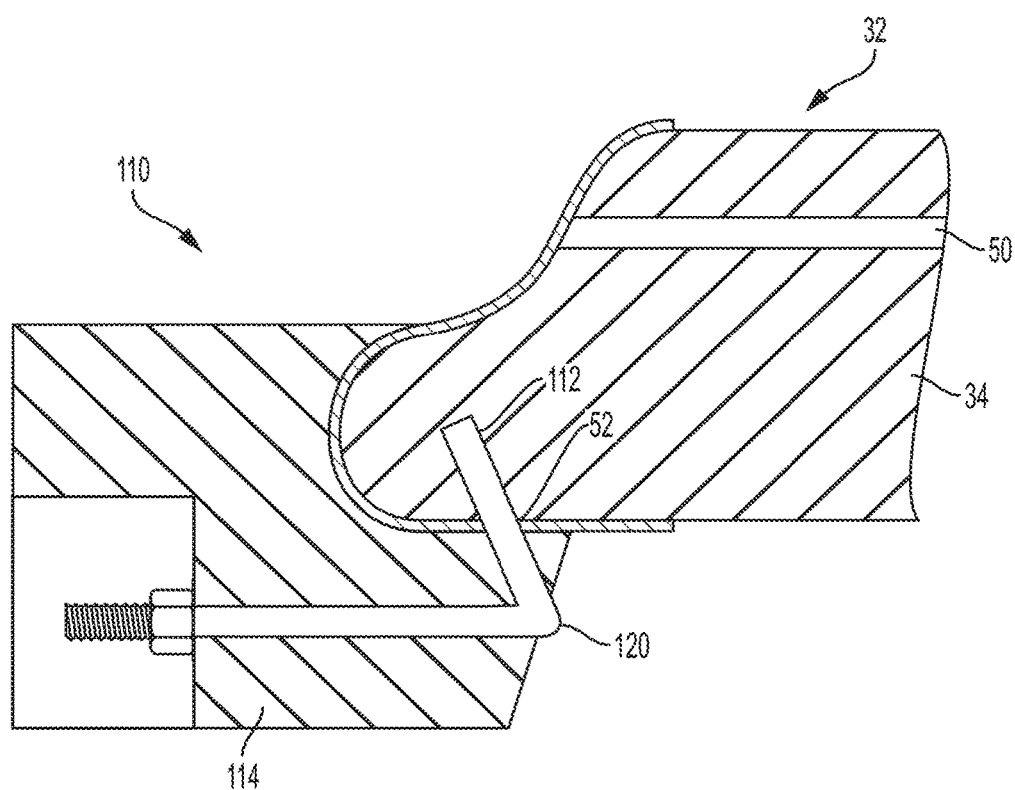
FIG. 9D is a schematic drawing of a cross-sectional view of the edge member and brace of FIG. 9C according to an aspect of the disclosure.
Figure 10:
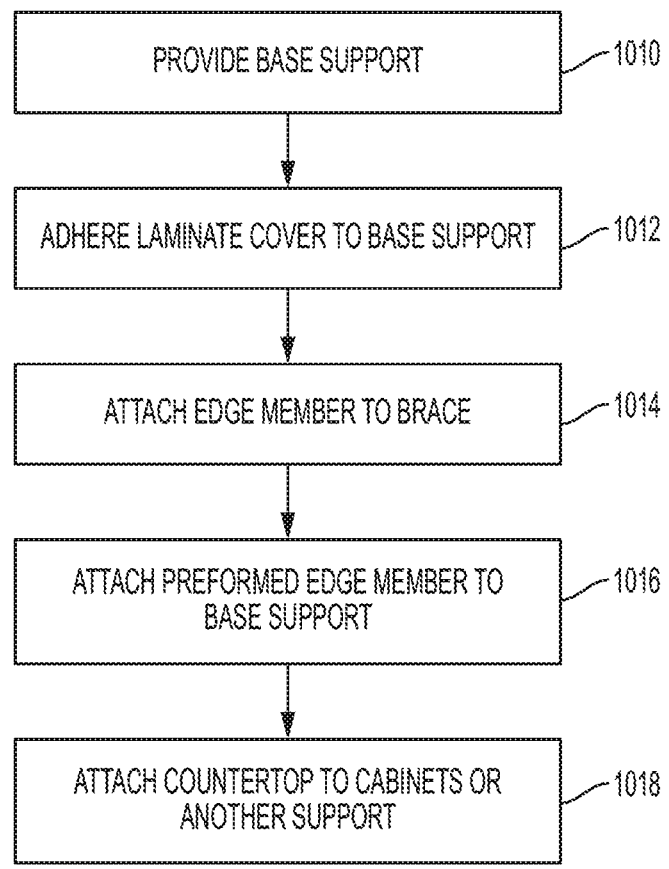
FIG. 10 is a flow chart showing steps for making a laminate countertop including an edge member according to an aspect of the disclosure.

The edge member 32 and countertop 10 can be manufactured using a number of different processes. In some instances, aspects of manufacturing processes can be automated using laminating machinery, stamp presses, and table saws as are known in the art. In some instances, conveyer belt or roller systems can be used to automatically transport portions of the countertop from one machine to another. In other examples, aspects of the manufacturing process can be performed manually. For example, a user may manually apply adhesives or glue to different portions of the wood supports or laminate cover. A user may also manually assemble structures such as the base support 14 or plug 34. Steps for forming the edge member 32 are shown in FIG. 7. Steps for forming a countertop 10 including one or more edge members 32 are shown in FIG. 10.

Edge Member Manufacturing Process

FIG. 7 illustrates a process for manufacturing the edge member 32. As described herein, the edge member 32 can be attached to a base support 14 to form a laminate countertop 10 with a curved edge profile 16 extending around two or more adjacent sides 28, 30 thereof. As shown in FIG. 7, a method of forming an edge member of a laminate countertop having a curved edge profile includes carving the curved edge profile on a front side of an edge support as shown at 710. In some examples, the plug 34 includes a wood board or composite board formed from wood material, such as plywood. As previously discussed, the plug 34 should be sufficiently strong to counteract a bias of the laminate cover 36 to prevent bowing. In some cases, as described herein, a larger edge support can be used while the laminate cover 36 is being adhered to the plug 34. The plug 34 can be cut to a smaller size after the adhesive for attaching the laminate cover to the edge support dries.

In many cases, prior to being cut to include the curved edge profile 16, the plug 34 has a substantially square or rectangular cross-section. For example, the plug 34 can be about 1.0 to 3.0 inches in height and/or width. The plug 34 is intended to extend along a latitudinal side 28 of a countertop and, as such, should have a length which substantially corresponds to the width of the completed countertop. For example, the plug 34 may be about 40 inches to 60 inches in width, and preferably about 50 inches in width.

In some examples, forming the plug 34 can also include a step 712 of drilling holes in the plug 34. For example, step 712 can include drilling weep holes 50 extending through the plug 34 for receiving excess glue or adhesive. Exemplary weep holes 50 are shown in FIG. 5.

The method also includes a step 714 of stamping a flexible laminate sheet by pressing a die having the curved edge profile against the sheet to produce a laminate cover 36 having the curved edge profile. This stamping process, also referred to as pre-stamping, effectively imparts the curved edge profile 16 to the laminate cover 36. The laminate cover 36 can be formed from any suitable polymer and/or resin material. While the cover can include many different colors, patterns, and textures, generally, the laminate cover 36 is formed from the same laminate material which covers the base support 14 of the countertop 10. In this way, the countertop 10 will appear to be formed from a single solid material, as is the case with natural stone and synthetic solid material countertops.

Stamping can be performed using a manually activated or automated stamping press as is known in the art. A conventional stamping press uses hydraulic cylinders, air cylinders, or mechanical force generating mechanisms to press the die against the sheet to impart the desired shape to the sheet. In some cases, the sheet can be heated prior to stamping to increase flexibility of the sheet. After stamping, the formed laminate cover can be permitted to cool so that the cover adopts the shape of the curved edge profile.

The method also includes a step 716 of adhering the laminate cover 36 to the curved edge profile 16 of the plug 34 using a curable adhesive, such as an epoxy resin. For example, as shown schematically in FIGS. 8A and 8B, the plug 34 can be inserted into the pre-stamped laminate cover 36 in a direction of arrow A1 such that the outer surface 44 of the plug 34 is pressed against an inner surface 36a of the laminate cover 36. The adhesive is placed on the outer surface 44 of the plug 34 and/or on the inner surface 36a of the laminate cover 36 for adhering the laminate cover 36 to the plug 34. In some cases, the adhesive can be applied manually. In other cases, automated machinery can be used for providing an appropriate amount of adhesive at a desired position on the plug 34 and/or laminate cover 36. As previously described, the plug 34 can include the weep holes 50 for conducting any excess adhesive away from the point of contact between the cover 36 and plug 34 to ensure good contact and adhesion between the cover 36 and support 34. The plug 34 can also include the brace holes 52 for attaching the brace 110 to the plug 34.

The method also includes a step 717 of drilling one or more brace holes 52 for receiving a brace mechanism, clamp, or hook for holding the plug 34 while adhesive used for attaching the plug 34 to the laminate cover is cured and/or dries. The brace holes 52 can be drilled through the laminate cover 36 and into the plug 52. Brace holes 52 for attaching the plug 34 to the brace 110 are shown in FIGS. 9A-9D.

The method further includes a step 718 of attaching the brace 110 to the plug 34 and laminate cover 36 to hold the laminate cover 36 against the plug 34 in a desired position. The brace 110 is provided to counteract the biasing force of the laminate cover 36 and to allow the adhesive to set so that the laminate cover 36 is strongly adhered to the plug 34. More specifically, as previously described, the flexible sheet used to form the laminate cover will naturally return to a rolled or curved position absent sufficient support. Therefore, the laminate cover 36 can cause the plug 34 to bow or bend. The brace 110 is configured to counteract such bending by providing added support for the plug 34 as the adhesive sets. The brace also provides a flat longitudinal surface, which can be used as a guide or jig when cutting grooves for attaching the edge member to other portions of a laminate countertop.

As shown in FIGS. 9A-9D, in which a number of embodiments of the brace 110 are illustrated, the brace 110 is a longitudinally extending structure including a body portion 114 having a surface 116 shaped to receive the curved edge profile 16 of the laminate cover 36 and plug 34 and an opposing longitudinal flat surface 108, which can be used as a guide or jig when using a table saw to cut grooves or channels on portions of the edge member. For example, the flat longitudinal surface 108 of the brace 110 can be pressed against a table saw fence or similar structure for performing a longitudinal cut on the edge member, thereby producing an edge member having an exact and easily reproducible thickness. The brace 110 also includes the one or more hooks 112 extending from the body portion 114 for drawing the plug 34 and laminate cover 36 against the surface 116 of the body portion 114. The hooks 112 can include a horizontal portion 118 and an angled or vertical portion 120. As discussed above, the horizontal portion 118 can be slightly angled relative to the horizontal. For example, the portion 118 can be elevated by about 10 degrees or 15 degrees relative to the horizontal. The angled or vertical portion 120 is configured to be inserted in the brace holes 52 extending from the bottom surface 54 of the lower lip 40 of the plug 34. Once the hooks 112 are inserted in the respective brace holes 52, the brace 110 can be tightened using a conventional technique (e.g., turning a nut and screw 53 to draw the plug 34 toward the brace body 114) to apply pressure to the laminate cover 36.

The brace body 114 and hooks 112 can be formed from any suitable material sufficient to provide support for the laminate cover 36 and plug 34. For example, the brace body 114 and/or hooks 112 can be a metal brace formed from aluminum or other light weight rigid metals. Various rigid plastic materials, such as high density polyethylene, polystyrene, or polycarbonates, may also be used for portions of the brace 110.

With continued reference to FIG. 7, the method can also include a step 720 of cutting the edge member to a desired thickness. The step is performed while the brace 110 is still connected to the plug 34 to provide support for the plug 34. As discussed herein, the flat longitudinal surface 108 of the brace 110 also assists in positioning the plug 34 for making the cut(s). In particular, the flat longitudinal surface 108 of the brace positions the plug 34 a defined distance from a saw blade so that an edge member of exact and consistent thickness is easily produced. In some examples, the cut is performed with a single blade to produce an edge member with a substantially flat rear surface, as shown in FIGS. 3C and 3D.

In other examples, the cutting step can produce a plug 34 having an upper lip 38, a lower lip 40, and a central portion 42 extending between the upper and lower lips 38, 40. As shown in FIG. 5A, in some examples, the angle α between the inwardly directed or rear surface 46 and a top surface 48 of the lower lip 40 is about 90 degrees. In other examples, the angle may be acute (e.g., between about 60 degrees and 90 degrees), as would be useful if an angle or slope defined by the curved edge profile 16 is also acute. In other examples, the groove angle α is slightly obtuse (e.g., between about 90 degrees and 100 degrees). The sides or surfaces of the groove can be about 0.5 inch to 2.5 inches in length.

The groove can be cut using suitable cutting techniques and machinery, as is known in the art. For example, a table saw including one or more rotating blades can be used for cutting one or more grooves on the plug 34. In some cases, the saw blade can be angled to cut a groove in a single pass. In another example, two rotating saw blades can be used. In that case, cutting the groove can include cutting a first cut with a first rotating saw blade followed by cutting a second cut with a second rotating saw blade to form the groove. For example, the first cut can be a substantially vertical or slightly angled cut extending from a top portion of the support 34. The second cut can be a horizontal cut extending from the rear side of the support 34.

The method can further include a step 722 of forming a channel (such as adhesive channel 62 shown in FIGS. 5A and 5B) for receiving adhesives on a rear surface of the edge member 32. For example, the channel may be cut or carved on the rear surface of the plug 34 using a router as is known in the art.

The method can further include a step 724 of cutting angled edges or sides on each end of the edge member 32 so that the edge member 32 can be attached to a countertop 10 to form corners. For example, while the brace 110 is still edged to the edge member 32, the angled edges or sides can be cut at a 45 degree angle and can be configured to be in face-to-face contact with corresponding angled surfaces of the base support 14 to form a suitable corner which appears to include a continuous edge profile extending around the corner. In other examples, the angled edges can be cut at other angles, such as 30 degrees or 60 degrees. In this way, the curved edge profile can be configured to extend around irregular shaped corners.

Countertop manufacturing process

With reference to FIG. 10, a method for forming a laminate countertop 10 including edge members 32 on one or more latitudinal edges or sides 28 thereof is illustrated. The method of forming the countertop 10 includes a step 1010 of providing a base support 14 having a top surface, a bottom surface, opposing latitudinal sides, and opposing longitudinal sides, wherein at least one of the longitudinal sides comprises a curved edge profile. For example, as previously described, the base support 14 can be a wood board or a composite board formed from laminated wood material, such as a plywood board. The base support 14 can be formed from a single board. In other examples, the base support can include additional wood or composite boards attached to sides of a plywood board to form longitudinal sides having the curved edge profile. As previously described, the curved edge profile can be a decorative edge profile having one or more convexly curved portions. The base support 14 is generally between about 40 inches and 60 inches in width. The length of the provided base support 14 is determined based on size of the installation. In some examples, countertop segments are available in pre-sized lengths of 6 feet, 8 feet, 10 feet, 12 feet, or more. Countertops 10 can be cut to a desired length prior to installation.

The method also includes a step 1012 of adhering a laminate sheet to the base support 14 to form a laminate cover 12 over at least a portion of the top surface 24 and a portion of the curved edge profile 16 of the base support 14. As previously discussed, the laminate cover 12 can be a flexible polymer and/or resin sheet. The cover can also include textile or fabric portions enclosed by cured resin. The laminate cover can include a color pattern, texture, and design selected to resemble other popular counter materials such as natural stone.

In some examples, adhering the laminate cover 12 to the base support 14 can include applying an adhesive, such as epoxy resin, to the surface of the base support and then pressing the laminate sheet against the base support. The adhesive can be epoxy resin or other synthetic polymeric glues or curable materials capable of adhering a laminate sheet formed from plastic or resin to the base support. In some examples, the step 1012 of adhering the laminate cover 12 to the base support 14 is performed using a laminating machine, as is known in the art. A laminating machine applies heat and pressure to the laminate sheet to activate and cure the adhesive.

In some examples, adhering the laminate cover 12 to the base support 14 involves adhering portions of the laminate cover 12 over the curved edge profile 16 on the longitudinal side(s) 30 of the base support 14. In this way, a longitudinal side 30 with the curved edge profile 16 is formed.

The method also includes a step 1014 of mounting a preformed edge member 32 to a brace, such as brace 110 shown in FIGS. 9A-9D. The brace 110 provides support for a formed edge member and, in particular, removes any bowing or bending of the edge member 32 so that the edge member 32 can be properly aligned to the base support 14.

In some examples, the edge member 32 used for forming a countertop 10 is an edge member 32 formed according to the method shown in FIG. 7. In that case, the brace 110 can be attached to the edge member 32 during a step of adhering the laminate cover 36 to the plug 34. However, edge members 32 formed using other methods can also be used, provided that the edge member 32 is a correct size and shape to be attached to the base support 14. For example, an edge member 32 manufactured with a bowed orientation can be mounted to the brace 110 to remove the curvature. Once the curvature is removed, the edge member 32 can be mounted to the laminate countertop as discussed herein.

For example, as shown at step 1016, the edge member 32, which is mounted to the brace 110, can be attached to the base support 14 to form a laminate countertop 10. Once the edge member 32 is securely counted to the base support 14, the brace can be removed. When connected together in this manner, a curved edge profile 16 extending around at least two adjacent sides of the countertop 10 is formed. Further, the edge member 32 should be sufficiently rigid to prevent bowing so that the top and sides of the edge member line up with corresponding top and sides of the base support 14. The edge member 32 should include a curved edge profile 16 that matches the curved edge profile 16 of the longitudinal side(s) 30 of the base support 14. As previously described, the edge member 32 includes the plug 34 and laminate cover 36 extending over the curved edge profile 16 of the plug 34. The laminate cover 36 can be formed from a material having a similar appearance (e.g., same color and texture) as the laminate sheet adhered to the base support. As such, the completed countertop appears to be formed from a carved stone slab or from a solid synthetic material rather than from a laminate material.

Figure 11:
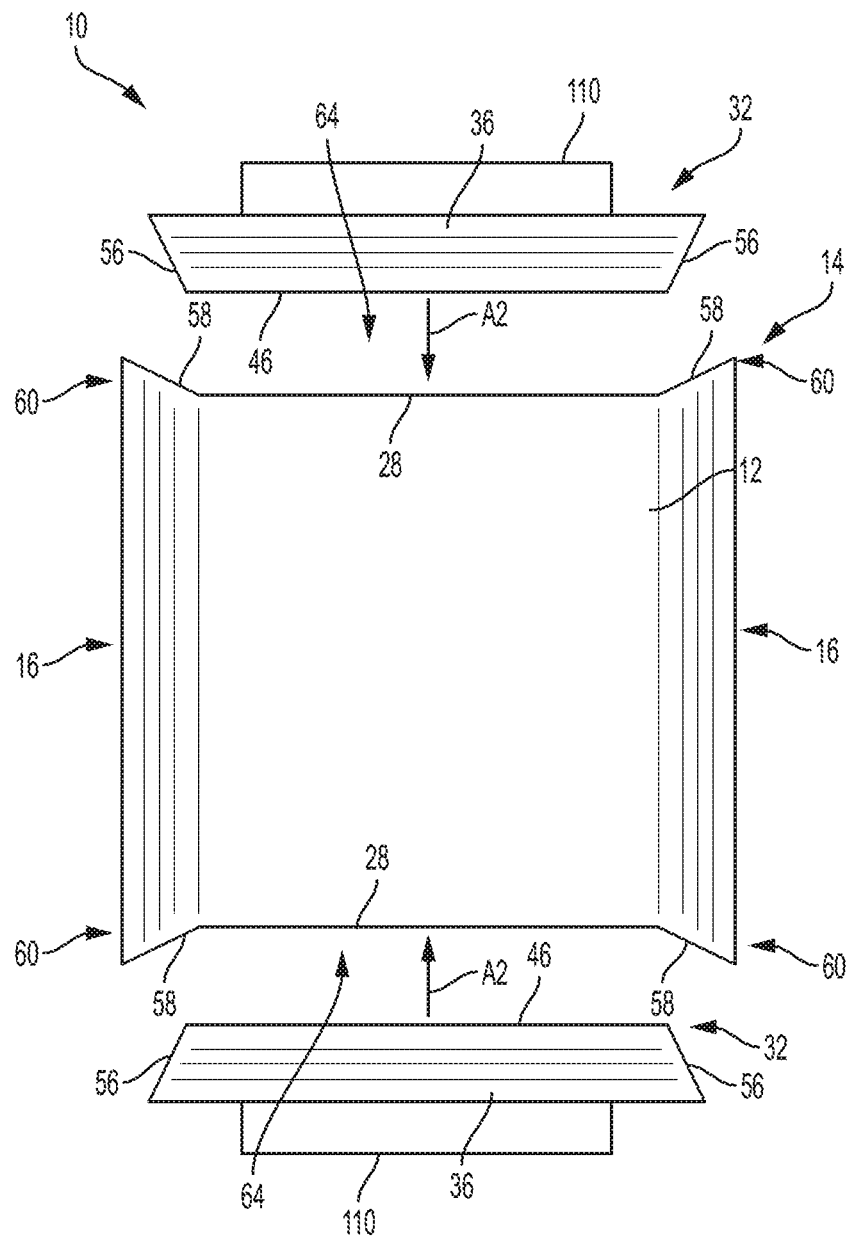
FIG. 11 is a schematic drawing of a top view of edge members being connected to a base support to form a laminate countertop according to an aspect of the disclosure.

A schematic drawing showing how an edge member 32 mounted to a brace 110 is attached to the base support 14 to form a countertop 10 is shown in FIG. 11. As shown in FIG. 11, in some examples, the base support 14 is formed with angled corner edges 58 sized to receive angled sides 56 of the edge member 32 to form a corner, generally shown by number 60, of the countertop 10. For example, the sides 56 can be angled at about a forty-five degrees. As shown by arrow A2, the edge member 32 is inserted into a space 64 between the corner edges 58 of the base support 14 such that the inwardly directed or rear surface 46 of an upper lip 38 of the plug 34 is in face-to-face contact with a latitudinal side 28 of the base support 14. Further, a top surface 48 of the lower lip portion 40 of the plug 34 is brought into face-to-face contact with the bottom surface 26 of the base support 14. The edge member 32 can be attached to the base support 14 using a combination of curable adhesives and mechanical fasteners. For example, wood glue can be applied to the corresponding surfaces 36, 48 of the edge member 32 and base support 14 to form a secured connection between the edge member 32 and base support 14. Mechanical fasteners such as nails or screws can be inserted between the base support 14 and edge member 32 to provide additional strength. For example, screws can be inserted through the lower lip 40 of the edge member 32 and into the bottom surface 26 of the base support 14.

As previously described, an edge member 32 can be attached to both latitudinal sides 28 of the base support 14 to form a countertop 10 having a curved edge profile 16 extending around all four sides of the countertop 10. A countertop 10 with four curved sides would be used for kitchen islands and similar structures in which all sides of the countertop are visible. In other examples, an edge member 32 may only be attached to one of the latitudinal sides 28 of the base support 14 if, for example, the other side is intended to be positioned against a wall, appliance, or is not easily seen for some other reasons.

As shown at step 1018, the completed countertop 10 can be mounted to cabinetry or another type of support (e.g., a table, bar, or counter) to form a completed structure. In many cases, the countertop 10 is attached to the cabinetry or support structure at the installation location. For example, a contractor may mount the countertop 10 to installed cabinets. In other examples, the countertop 10 can be mounted to a piece of modular furniture prior to installation of the furniture. The modular furniture can be available in predetermined sizes. The modular furniture can be transported to an installation location and installed with the laminate countertop 10 already in place.

The embodiments have been described with reference to various examples. Modifications and alterations will occur to others upon reading and understanding the foregoing examples. Accordingly, the foregoing examples are not to be construed as limiting the disclosure.

The invention claimed is:

1. A method of forming a laminate countertop with a curved edge profile extending around at least two adjacent sides thereof, the method comprising:
   providing a base support comprising a top surface, a bottom surface, opposing latitudinal sides, and opposing longitudinal sides, wherein at least one of the longitudinal sides comprises a curved edge profile;
   adhering a laminate sheet to the base support to form a laminate cover over at least a portion of the top surface and a portion of the curved edge profile of the base support; and
   mounting a preformed edge member comprising a curved edge profile to one of the sides of the base support to form a laminate countertop having curved edges extending around at least two adjacent sides of the countertop,
   wherein, in order to align the preformed edge member and the base support, the preformed edge member is mounted to a brace to remove bowing or curvature from the preformed edge member, and
   wherein the brace comprises at least a body portion having a curved longitudinal surface configured to be pressed against at least a portion of the curved edge profile of the preformed edge member, and at least a hook for pulling the preformed edge member against the body of the brace to remove the bowing or curvature from the preformed edge member.

2. The method of claim 1, wherein the base support is between about 40 inches and about 60 inches wide.

3. The method of claim 1, further comprising forming a backsplash by folding a portion of the base support and laminate cover adjacent to one of the longitudinal sides to form a substantially vertical surface relative to the top surface of the base support.

4. The method of claim 1, wherein the base support comprises a wood board or a composite material formed from a laminate of wood material, and wherein the base support has a thickness of between about 0.5 inch and 2.0 inches.

5. The method of claim 1, wherein the curved edge profile comprises a decorative profile comprising at least two convexly curved portions.

6. The method of claim 5, wherein the curved edge profile further comprises a flat vertical or angled surface between the convexly curved portions.

7. The method of claim 1, wherein the edge member has a longitudinal length of between about 40 inches and about 60 inches.

8. The method of claim 1, wherein mounting the brace to the edge member comprises inserting a portion of the hook into a corresponding hole on a bottom surface of the edge member and tightening the hook to draw the edge member toward the body portion of the brace.

9. The method of claim 1, further comprising forming the preformed edge member prior to mounting the preformed edge member to the base support, wherein forming the preformed edge member comprises:
   cutting the curved edge profile on a front side of a plug having a square or rectangular cross section;
   stamping a flexible laminate sheet by pressing a die having the curved edge profile against the flexible laminate sheet to produce a pre-stamped laminate cover having the curved edge profile;
   adhering the pre-stamped laminate cover to the curved edge profile of the plug using an adhesive;
   attaching the brace to the plug and to the laminate cover to hold the pre-stamped laminate cover against the plug in a desired position; and
   after the adhesive dries or cures and while the brace remains attached to the plug and laminate cover, making a longitudinal cut along a rear side of the plug to form the preformed edge member of a desired thickness.

10. The method of claim 9, wherein the adhesive comprises an epoxy resin.

11. The method of claim 9, wherein stamping the flexible laminate sheet comprises heating the sheet to increase flexibility of the sheet prior to pressing the die against the sheet.

12. The method of claim 9, further comprising, prior to adhering the laminate cover to the plug, drilling a plurality of weep holes extending between front and rear sides of the plug for receiving excess adhesive.

13. The method of claim 9, wherein the plug comprises a wood board or a composite board formed from a laminate wood material.

14. The method of claim 9, further comprising, after making the longitudinal cut, cutting latitudinal sides of the edge member at an angle relative to a longitudinal axis of the plug so that the edge member can be connected to the base support.

15. The method of claim 9, wherein making the longitudinal cut comprises cutting a groove from the rear side of the plug to form a plug comprising an upper lip, a lower lip, and a central portion between the upper and lower lips.

16. The method of claim 15, wherein an angle between an inwardly directed surface of the upper lip and a top surface of the lower lip is between about 60 degrees and 100 degrees.

17. The method of claim 15, wherein cutting the groove from the rear side of the plug comprises cutting a first cut with a first rotating saw blade followed by cutting a second cut with a second rotating saw blade.

18. The method of claim 17, wherein the first cut is a substantially vertical cut and the second cut is a substantially horizontal cut.

* * * * *